March 18, 1969 G. P. RODGERS 3,434,127

MAGNETIC STORAGE APPARATUS EMPLOYING HIGH PERMEABILITY AUXILIARY CORE

Filed Dec. 6, 1965 Sheet 1 of 2

INVENTOR
GERALD PATRICK RODGERS
BY
Kirschstein, Kirschstein + Ottinger
ATTORNEYS

INVENTOR
GERALD PATRICK RODGERS
BY
ATTORNEYS

United States Patent Office 3,434,127

Patented Mar. 18, 1969

3,434,127

MAGNETIC STORAGE APPARATUS EMPLOYING HIGH PERMEABILITY AUXILIARY CORE

Gerald Patrick Rodgers, Southampton, England, assignor to The General Electric Company Limited, London, England, a British company Filed Dec. 6, 1965, Ser. No. 511,820
Claims priority, application Great Britain, Dec. 7, 1964, 49,668/64
U.S. Cl. 340—174 20 Claims
Int. Cl. G11b *5/12*

Figure 1:
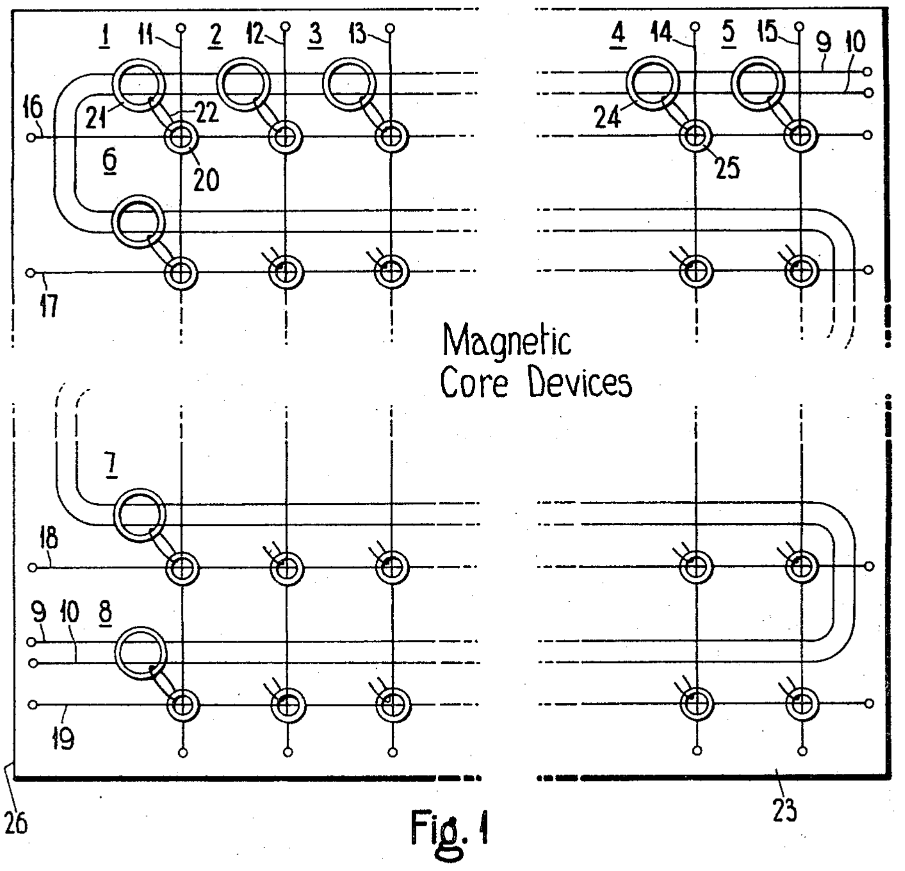

This invention relates to magnetic core devices.

More particularly the invention is concerned with magnetic data store devices of the kind in which a member of toroidal or other form such that it embraces an aperture is fabricated of ferromagnetic material having a generally rectangular hysteresis characteristic so as to provide two stable states of magnetic remanence that respectively approach the two polarities of magnetic saturation for that member, and in which a plurality of conductors are inductively coupled to the said member so that that member can be caused selectively to assume either of said states by supplying electric currents to one or more of these conductors and so that output pulses are induced in a further one or more of these conductors by any resulting change in state.

In known magnetic store devices of this kind, the electric current required in one or more of the said conductors of the device to change the state of the said member depends upon the size of that member. For this reason the said member and hence the aperture which it embraces usually are of very small size. If then the inductive coupling between the said member and the said conductors is obtained by having these conductors pass through the said aperture, the number of these conductors is severely limited.

It is an object of the present invention to provide an improved magnetic store device of the kind specified above in which the number of said conductors is not limited by the size of the aperture embraced by the said member.

A plurality of magnetic data store devices of the kind specified may form a data storage arrangement in which each such device has at least one conductor passing through its aperture that also passes through the apertures of several other magnetic data store devices. Owing to the smallness of the device and of the conductors, it is not readily possible to change the devices that are inductively coupled to a particular conductor and another object of the invention is to enable this to be done more easily.

According to the present invention, in a magnetic data store device a first ferromagnetic member of material having a generally rectangular hysteresis characteristic and hence a large coercivity, has an aperture through which pass one or more wires, a second ferromagnetic member of high permeability material having a small coercivity has an aperture which is larger than the aperture of the first member and through which pass a plurality of further wires, and a continuous electric conductor path passes through both apertures, the materials and dimensions of the two members being such that the remanent magnetisation of the first member may be set to either one of two states by supplying electric signals to one or more of said wires that pass through one of said apertures and that as the result of such a change in the state of the first member a signal is induced in another one or more of said wires that pass through the other one of said apertures.

The "coercivity" of a magnetic material is the magnetic field strength required to annul the remanent magnetisation obtained after magnetisation of the material up to saturation.

The first member may comprise a transfluxor.

In a particular embodiment of magnetic data store device in accordance with the present invention, a first ferromagnetic member of material having a generally rectangular hysteresis characteristic has an aperture through which pass a first plurality of control wires and a second ferromagnetic member has an aperture which is larger than the aperture of the first member and through which pass a second plurality of output wires, the second plurality being greater than the first plurality and there being a continuous conductor path that passes through both apertures, the materials and dimensions of the two members being such that the remanent magnetisation of the first member may be set to either one of two states by simultaneously supplying signals to at least two of the first plurality of wires and that as the result of a change in the state of the first member a signal is induced in said conductor path and thereby in each of said output wires without magnetically saturating the second member which then operates over a substantially linear part of its magnetisation characteristic.

In another embodiment of magnetic data store device in accordance with the present invention, a first ferromagnetic member of material having a generally rectangular characteristic has an aperture through which passes an output wire, a second ferromagnetic member of high permeability material having a small coercivity has an aperture which is larger than the aperture of the first member and through which pass a plurality of control wires, and a continuous electric conductor path passes through both apertures, magnetic flux changes in the first member inducing output signals in the output wire and the materials and dimensions of the two members being such that magnetic saturation of the first member in either direction is obtainable by energising any one of the control wires.

A magnetic data storage arrangement may employ a plurality of magnetic data store devices that are each in accordance with either one of the two preceding paragraphs.

Figure 2:
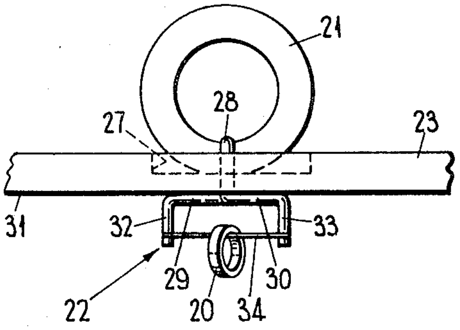
Figure 3:
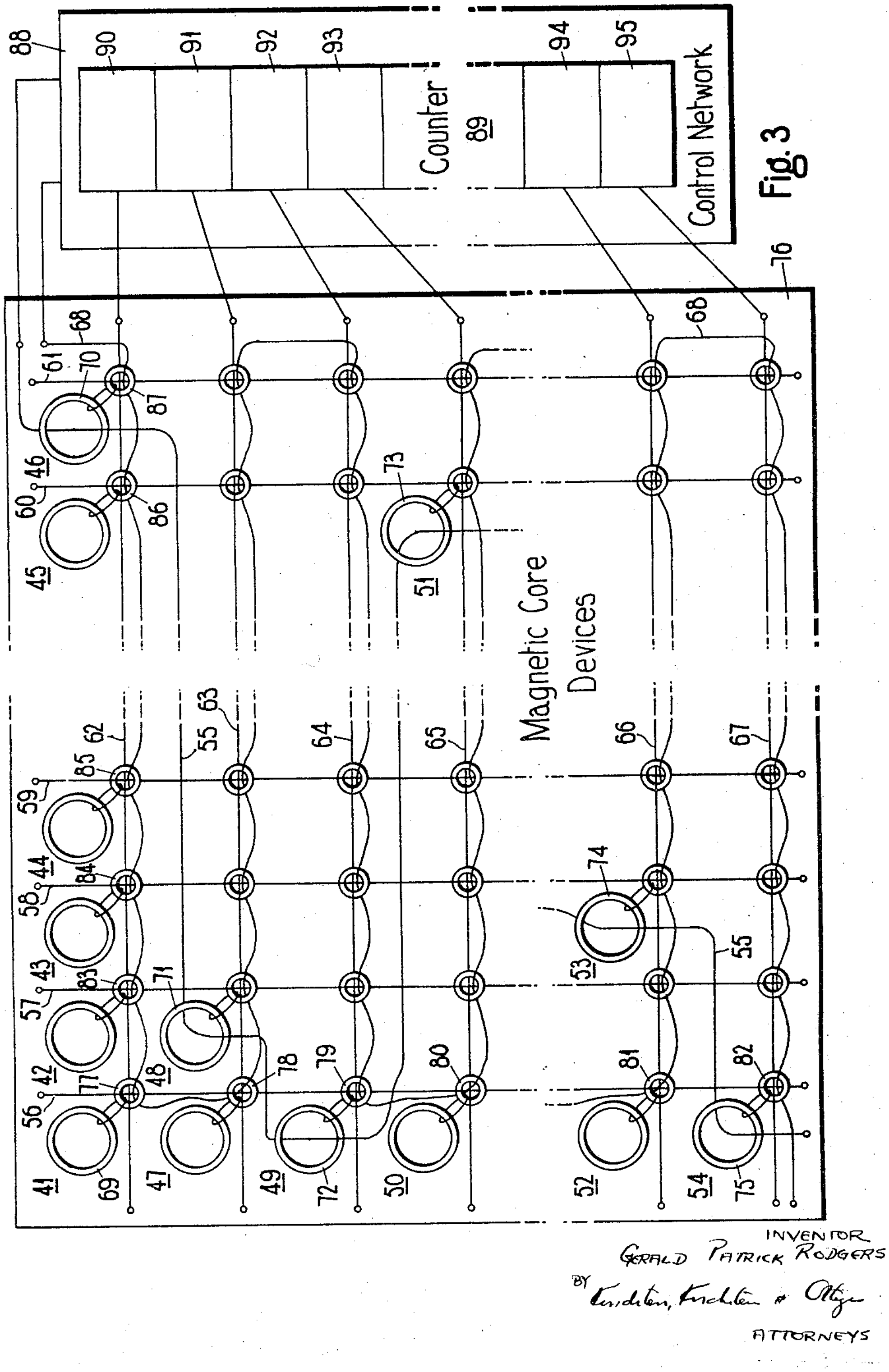

Two embodiments of data storage arrangement in accordance with the present invention will now be described, by way of example, with reference to the three figures of the accompanying drawings in which:

FIGURE 1 illustrates schematically the first embodiment of data storage arrangement, FIGURE 2 shows a detail of the construction of the data storage arrangement illustrated in FIGURE 1, and FIGURE 3 illustrates schematically the second embodiment of data storage arrangement.

Referring to FIGURE 1, the first embodiment of data storage arrangement to be described provides semi-permanent storage of two hundred and twenty five binary words which each comprises eighteen binary digits, and employs an individual magnetic core device for each word stored. Some only of these magnetic core devices, for example the devices 1 to 8, are depicted. Eighteen conductors which are hereinafter referred to as the "sense wires" and of which only the sense wires 9 and 10 are shown, are selectively coupled to each magnetic core device 1 to 8 so as to determine the values of the eighteen binary digits respectively of the binary word stored by that device. A further thirty conductors which are hereinafter referred to as the "control wires" and of which only the control wires 11 to 19 are shown, are coupled to the magnetic core devices 1 to 8 so as to facilitate the selective reading out of the binary words stored by those devices.

Each magnetic core device, for example the magnetic core device 1, has two toroidal core members 20 and 21.

One of these core members 20 is fabricated of a ferromagnetic ferrite material having a generally rectangular hysteresis characteristic and hence a large coercivity. This core member 20 has an external diameter of 0.14 inch and an internal diameter of 0.08 inch and subsequently is referred to as the "small core." The other core member 21 is fabricated of a high permeability ferromagnetic ferrite material having a low coercivity and a hysteresis characteristic that is substantially linear for at least a predetermined range of values of applied magnetic field. A suitable material is that sold under the trade name "Ferrolex P" by Salford Electrical Instruments Limited. This core member 21 has an external diameter of 0.5 inch and an internal diameter of 0.25 inch and subsequently is referred to as the "large core." The core members 20 and 21 are linked by a continuous conductor path 22 of copper wire which passes once through the aperture in the small core 20 and once through the aperture in the large core 21.

The core devices 1 to 8 are mounted on a board 23 of electrical insulating material and are arranged in a matrix comprising fifteen columns and fifteen rows of these devices. Fifteen of the control wires such as the control wires 11 to 15 are associated with the fifteen columns respectively of the core devices. Each of these control wires, for example the control wire 11, passes through the aperture of the small core 20 of every core device 1, 6, 7, 8 in the associated column. The other fifteen control wires, such as the control wires 16 to 19, are associated with the fifteen rows respectively of the core devices. Each of these control wires, for example the control wire 16, passes through the aperture of the small core 20 of every core device 1, 2, 3, 4, 5 in the associated row. Thus each of the core devices 1 to 8 is coupled inductively to a different combination of one column control wire 11, 12, 13, 14, 15 and one row control wire 16, 17, 18, 19.

The sense wires, such as the sense wires 9 and 10, extend to and fro across the board 23 and pass along a different row of the core devices on each traverse of that board. The eighteen sense wires correspond respectively to the eighteen digit positions in the binary words stored by the core devices. With each core device, for example the core device 4, the sense wire, such as the sense wire 9, corresponding to any digit position at which the binary digit "1" is stored passes through the aperture in the large core 24 of that device 4 and the sense wire, such as the sense wire 10, corresponding to any digit position at which the binary digit "0" is stored by-passes that device 4.

Each continuous conductor path, such as the conductor path 22 of the magnetic core device 1, is arranged so as to provide a high degree of inductive coupling between the two core members 20 and 21 of that device. Consequently the sense wires 9, 10 that pass through the aperture in the large core 21, 24 of any magnetic core device 1 to 8 are coupled inductively to the small core 20, 25 of that device to almost the same degree as if they passed through the aperture in that small core.

The manner in which each magnetic core device is mounted on the board 23 is illustrated in respect of the magnetic core device 1 in FIGURE 2 to which reference now also should be made. FIGURE 2 shows part of an end elevation of the data storage arrangement looking towards the edge 26 of the board 23.

The large core 21 is mounted on edge on the board 23 with its aperture facing the edge 26 of that board. To this end the core 21 is located in a slot 27 in the board 23 and may be retained in this slot with the aid of a synthetic resin cement. A length of tinned copper wire 28, which provides part of the continuous conductor path 22, passes through an aperture in the board 23 that is adjacent to one edge of the slot 27, through the aperture in the core 21 and back through a second aperture in the board 23 that is adjacent to the opposite edge of the slot 27. The ends of this wire 28 are bent so that parts 29 and 30 thereof extend in opposite directions parallel to the edge 26 of the board 23 and abut the surface 31 of the board 23 to hold the core 21 in the slot 27, and further parts 32 and 33 of this wire 28 project away from the board 23. The conductor path 22 is completed by a length of tinned copper wire 34 which has its two ends attached by soldering to the parts 32 and 33 respectively of the wire 28. The wire 34 passes through the aperture in the small core 20 which thus is suspended from this wire.

It will be appreciated from FIGURE 2 that in reality the two cores 20 and 21 are on opposite sides of the board 23 as therefore are the control wires such as the control wires 11 to 19, and the sense wires such as the sense wires 9 and 10.

During operation, all the magnetic core devices 1 to 8 normally have their small cores 20, 25 conditioned to a predetermined one of the two stable magnetic states which result from the rectangular hysteresis characteristics of those cores and which correspond to the two distinct values of remanent magnetic flux that can be obtained in each of those cores.

When it is required to read out the binary word stored by any one of the magnetic core devices, for example the core device 1, generally coincident electric current pulses are supplied to the two control wires 11 and 16 which are associated respectively with the row and column of the said matrix that have this device at their intersection. Each of these current pulses has the sense necessary to change any small core 20 that it traverses from the said predetermined one of its two stable states to the other but is of insufficient magnitude to effect that change. This magnetic core device 1, but no other, receives both of these current pulses and their respective magnitudes are such that together these pulses effect the said change in the state of the small core 20 of that device 1.

The said change in the state of the small core 20 of the particular magnetic core device 1 under consideration corresponds to an appreciable change in the magnetic flux of this core. This magnetic flux change is reflected into the large core 21 of this magnetic core device 1 and thus results in a voltage pulse being induced in each of the sense wires such as the sense wires 9 and 10 that passes through the aperture in this core. No such pulse is induced in the other sense wires (not shown). The presence and absence of such voltage pulses on the sense wires characterise the binary word stored by this magnetic core device 1.

Further current pulses having similar magnitudes and opposite senses to the original current pulses subsequently are supplied to the same two control wires 11 and 16 restore the small core 20 of this particular core device 1 to the said predetermined one of its two stable magnetic states. Those of the sense wires that previously had voltage pulses induced therein now have voltage pulses of the opposite polarity induced therein. Thus the binary word stored by this particular core device 1 again is characterised on the sense wires.

Referring now to FIGURE 3, the second embodiment of data storage arrangement to be described provides semipermanent storage of one hundred decimal numbers which may, for example, be telephone numbers and which each comprises ten decimal digits and employs one hundred magnetic core devices of which only some, such as the core devices 41 to 54, are depicted. There is an individual magnetic core device for each decimal value of each of the ten possible digits of each decimal number. One hundred conductors which subsequently are referred to as the "number wires" and of which only the number wire 55 is shown, are selectively coupled to the magnetic core devices of a different one of the hundred stored decimal numbers. A further twenty-one conductors of which only the conductors 56 to 68 are shown, are coupled to the magnetic core devices so as to facilitate the selective reading out of any one of the stored decimal numbers one digit at a time.

Each of the magnetic core devices such as the core devices 41 to 54 differs from the magnetic core devices such as the core devices 1 to 8 (FIGURE 1) of the first embodiment of data storage arrangement described above only in the dimensions of the large core of that device. Thus, in the present embodiment, each of the large cores such as the cores 69 to 75 has external and internal diameters of 1 inch and 0.5 inch respectively.

The core devices are mounted on a board 76 of electrical insulating material in the same manner as is described above with reference to FIGURE 2 for the core device 1 of FIGURE 1 and are arranged in a matrix comprising ten columns and ten rows of those devices. These ten rows of core devices correspond respectively to the ten digit positions of the stored decimal numbers and the ten core devices in each row correspond respectively to the ten decimal digit values. Thus the core devices 41, 42, 43, 44, 45 and 46 correspond respectively to decimal digit values 1, 2, 3, 4, 9 and 0. The ten core devices in any one column all correspond to the same decimal digit value.

Of the further twenty-one conductors, ten conductors, which subsequently are referred to as the "output wires" and of which only the output wires 56 to 61 are shown, are associated with the ten columns respectively and another ten conductors, which subsequently are referred to as the "control wires" and of which only the control wires 62 to 67 are shown, are associated with the ten rows respectively. Each of the output wires, such as the output wire 56, passes through the apertures of the small cores 77 to 82 of the magnetic core devices 41, 47, 49, 50, 52, 54 in the associated column and each of the control wires such as the control wire 62, passes through the apertures of the small cores 77 and 83 to 87 of the magnetic core devices 41 to 46 in the associated row. The other conductor 68, which subsequently is referred to as the "reset wire," extends to and fro across the board 76 and passes through the aperture of the small core 77 to 87 of each of the magnetic core devices.

The number wire 55, like every other number wire (not shown) passes through the aperture in the large core 70 to 75 of one of the core devices 41 to 54 in each of a number of the said rows that correspond to the number of digits in the decimal number stored in respect of that number wire. The actual core devices with which any one of the number wires thus is associated depends upon the values of the digits of the decimal number stored in respect of that number wire. For example, the number stored in respect of the number wire 55 has ten digits commencing with the digits 0 2 1 9 and ending with the digits 3 1.

The reset wire 68 is connected to a control network 88 that is associated with this storage arrangement. The network 88 includes an electric pulse counting circuit 89 having ten counting stages which are connected to the ten control wires respectively and of which only the stages 90, 91, 92, 93, 94 and 95 are shown that are associated with the control wires 62 to 67. Each of the counting stages of the counting circuit 89 has an "on" condition and an "off" condition and is arranged so that, during the reading out of any decimal number that is stored by the storage arrangement, a control current of predetermined magnitude and sense is supplied to the associated one of the control wires 62 to 67 only when that stage is in its "off" condition. The counting circuit 89 is arranged so that its stages assume the said "on" condition in sequence and one at a time when it is operated. When any one stage is "on," the other nine stages are "off."

Normally all the magnetic core devices such as the core devices 41 to 54 have their small cores such as the cores 77 to 87 conditioned to a predetermined one of their two stable magnetic states. When it is required to read out the stored decimal number characterised by any one the number wires, for example the number wire 55, the counting circuit 89 is operated so that the counting stages associated with the said first, second, third, fourth, fifth, sixth, seventh, eighth, ninth and tenth rows of core devices assume the "on" condition in that order. Also this number wire 55 is energised with an electric current pulse by the control network 88 each time a different one of the counting stages such as the stages 90 to 95 assumes the "on" condition.

The magnitude and sense of each such current pulse are suitable to change the state of the small core of each magnetic core device 46, 48, 49, 51, 53, 54 associated with the energised number wire 55. However, the magnitude and sense of the said control current that is supplied to any one of the control wires 62 to 67 are such as to inhibit such a change of state in any of the small cores associated with that control wire. Consequently, the first current pulse supplied to the energised number wire 55 changes the state of only that small core 87 which is in the first row and through which this number wire passes. This change of state causes an electric pulse to be induced in the associated one 61 of the output wires and thereby indicate the decimal value 0 of the first digit in the decimal number that is characterised by the energised number wire 55. Succeeding current pulses on this number wire 55 produce output pulses on the output wires 56 to 61 that indicate the values of succeeding digits of this number.

Subsequent to each said current pulse, the control network 88 causes an electric current pulse to be supplied to the reset wire 68. The magnitude and sense of the latter pulse are such that the small core, such as the small core 87, which had its state changed by the former pulse now is restored to the said predetermined one of its two states. An output pulse again is induced in the output wire 61 associated with this small core 87 this output pulse having the opposite voltage polarity to the output pulse previously induced in that output wire.

As previously mentioned, the decimal numbers characterised by the number wires such as the number wire 55 may be telephone numbers. Thus, this data storage arrangement may form part of a translator (not shown) in a telephone system which is operable to produce trains of electric pulses or combinations of voice frequency signals that represent the digit values of any one of these telephone numbers. This translator may itself form part of so-called "abbreviated dialling" equipment (not shown) in an automatic telephone exchange (not shown). Such equipment is arranged to produce the trains of pulses or combinations of voice frequency signals that represent the telephone number characterised by any one of the number wires in response to further trains of pulses of voice frequency signals received from a telephone station that represent a code number which characterises this number wire and which has considerably fewer digits than this telephone number.

The first embodiment of data storage arrangement (FIGURE 1) described above may also be employed in such equipment for controlling and supervising the sequence of operations performed in that equipment in respect of each said code number.

I claim:

1. A magnetic data store device comprising:
   (a) a first ferromagnetic member which is fabricated of high permeability material having a small coercivity and which has an aperture,
   (b) a second ferromagnetic member which is fabricated of material having an approximately rectangular hysteresis characteristic and hence a large coercivity,
      (i) said second member being of small size relative to the first member whereby it requires a weaker magnetic field for magnetic saturation than said first member, and (ii) said second member having an aperture that is small relative to the aperture of said first member, (c) a number of wires which pass through the aperture of said first member, (d) a smaller number of wires which pass through the aperture of said second member, (i) the said wires which pass through the aperture of one member comprising control wires for carrying electric control signals to induce magnetic flux changes in this one member, and (ii) the said wires which pass through the aperture of the other member comprising output wires in which electric output signals are induced by magnetic flux changes in this other member, and (e) a continuous electric conductor path which passes through both apertures and in which electric signals are induced by and induce magnetic flux changes respectively in the member associated with said control wires and the member associated with said output wires.

2. A magnetic data store device according to claim 1 wherein each of the first and second members is of toroidal form.

3. A magnetic data store device according to claim 1 wherein the conductor path passes only once through each aperture.

4. A magnetic data store device according to claim 1 wherein a board of electrical insulating material carries the first and second members.

5. A magnetic data store device according to claim 4 wherein there is provided electrically conducting mounting means by which the first member is attached to the board and which comprises part of said conductor path.

6. A magnetic data store device according to claim 5 wherein the mounting means comprises a length of wire of which a portion passes through the board, through the aperture of the first member and back through said board and of which two end portions are bent to bear against said board and so hold said first member in place.

7. A magnetic data store device according to claim 6 wherein a further length of wire is connected between the two end portions to complete the conductor path, this further length of wire passing through the aperture of the second member.

8. A magnetic data store device according to claim 4 wherein the first and second members are on opposite sides of the board.

9. A magnetic data store device according to claim 1 wherein the first member has a cross-sectional area for its aperture that is between five and forty times as large as the cross-sectional area of the aperture of the second member.

10. A magnetic data storage arrangement that employs a plurality of magnetic data store devices each according to claim 1.

11. A magnetic data storage arrangement according to claim 10 wherein a board of electrical insulating material carries the first and second members of every magnetic data store device.

12. A magnetic data store device comprising:

(a) a first ferromagnetic member which is fabricated of high permeability material having a small coercivity and which has an eperture, (b) a second ferromagnetic member which is fabricated of material having an approximately rectangular hysteresis characteristic and hence a large coercivity, (i) said second member being of small size relative to the first member whereby it requires a weaker magnetic field for magnetic saturation than the first member, and (ii) said second member having an aperture that is small relative to the aperture of said first member, (c) two control wires which pass through the aperture of said second member and which are for carrying time coincident electric control pulses to induce magnetic saturation in either direction of said second member, (d) a continuous electric conductor path which passes through both apertures and in which electric signals are induced by and induce magnetic flux changes respectively in said second and first members, and (e) a number, greater than two, of output wires which pass through the aperture of said first member and in which electric output signals are induced by magnetic flux changes in said first member.

13. A magnetic data storage arrangement that employs a plurality of magnetic data store devices each according to claim 12.

14. A magnetic data storage arrangement according to claim 13 wherein the data store devices are arranged in a matrix comprising a plurality M of rows and a plurality N of columns of those devices, where M and N are integers, and wherein M control paths are associated with the M rows respectively and a further N control paths are associated with the N columns respectively, each control path comprising a series of the control wires that each belongs to a different one of the associated data store devices and the two control wires of each data store device being included in the two control paths respectively that are associated with the row and column containing that device.

15. A magnetic data storage arrangement according to claim 14 having a plurality of output paths which include the output wires of the magnetic data store devices and which are selectively coupled to these devices to determine that pieces of information stored by the storage arrangement.

16. A magnetic data store device comprising:

(a) a first ferromagnetic member which is fabricated of high permeability material having a small coercivity and which has an aperture, (b) a second ferromagnetic member which is fabricated of material having an approximately rectangular hysteresis characteristic and hence a large coercivity, (i) said second member being of small size relative to said first member whereby it requires a weaker magnetic field for magnetic saturation than said first member, and (ii) said second member having an aperture that is small relative to the aperture of said first member, (c) an output wire which passes through the aperture of said second member and in which electric output signals are induced by magnetic flux changes in said second member, (d) a continuous electric conductor path which passes through both apertures and in which electric signals are induced by and induce magnetic flux changes respectively in said first and second members, and (e) a plurality of control wires which pass through the aperture of said first member and each of which is for carrying electric control signals to induce magnetic flux changes in said first member having magnitudes such as to produce magnetic saturation of said second member in either direction.

17. A magnetic data storage arrangement that employs a plurality of magnetic data store devices each according to claim 16.

18. A magnetic data storage arrangement according to claim 17 wherein the data store devices are arranged in a matrix comprising a plurality M of rows and a plurality N of columns of those devices, where M and N are integers, and wherein there are N output paths which are associated with the N columns respectively and each of which comprises a series of the output wires that each belongs to a different one of the data store devices in the associated column.

19. A magnetic data storage arrangement according to claim 18 having a plurality of control paths which include the control wires of the data store devices and which are selectively coupled to these devices to determine the pieces of information stored by the storage arrangement.

20. A magnetic data storage arrangement according to claim 19 wherein each control path represents a stored decimal number and comprises a series of the control wires that belong to a plurality of the data store devices which represent the digits of that number, the M rows of data store devices corresponding respectively to M digit positions in the stored numbers and the devices in each row representing the decimal digit values.

References Cited

UNITED STATES PATENTS

| | | | |
|---|---|---|---|
| 2,811,710 | 10/1957 | Demer | 340—174 |
| 2,982,946 | 5/1961 | Kilburn et al. | 340—174 |
| 3,008,054 | 11/1961 | Saltz | 307—88 |
| 3,105,959 | 10/1963 | Klinkhamer | 340—174 |
| 3,126,527 | 3/1964 | McGuigan | 340—174 |
| 3,157,863 | 11/1964 | James | 340—174 |

FOREIGN PATENTS

| | | |
|---|---|---|
| 1,257,636 | 2/1961 | France. |

STANLEY M. URYNOWICZ, JR., *Primary Examiner.*